May 24, 1932.  H. VAN DEEST  1,859,480
COT FASTENER FOR AMBULANCES
Filed March 23, 1931  2 Sheets-Sheet 1
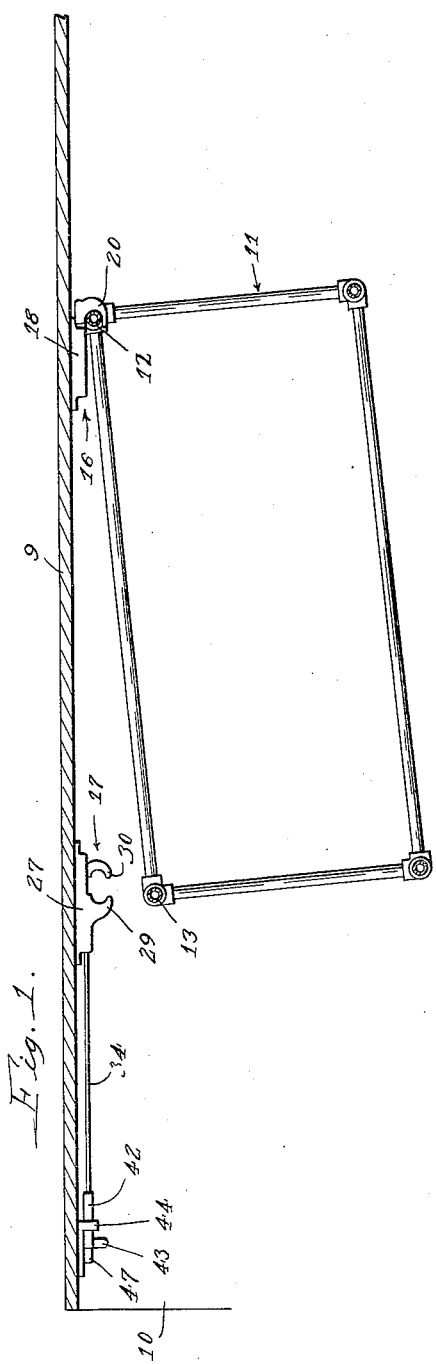

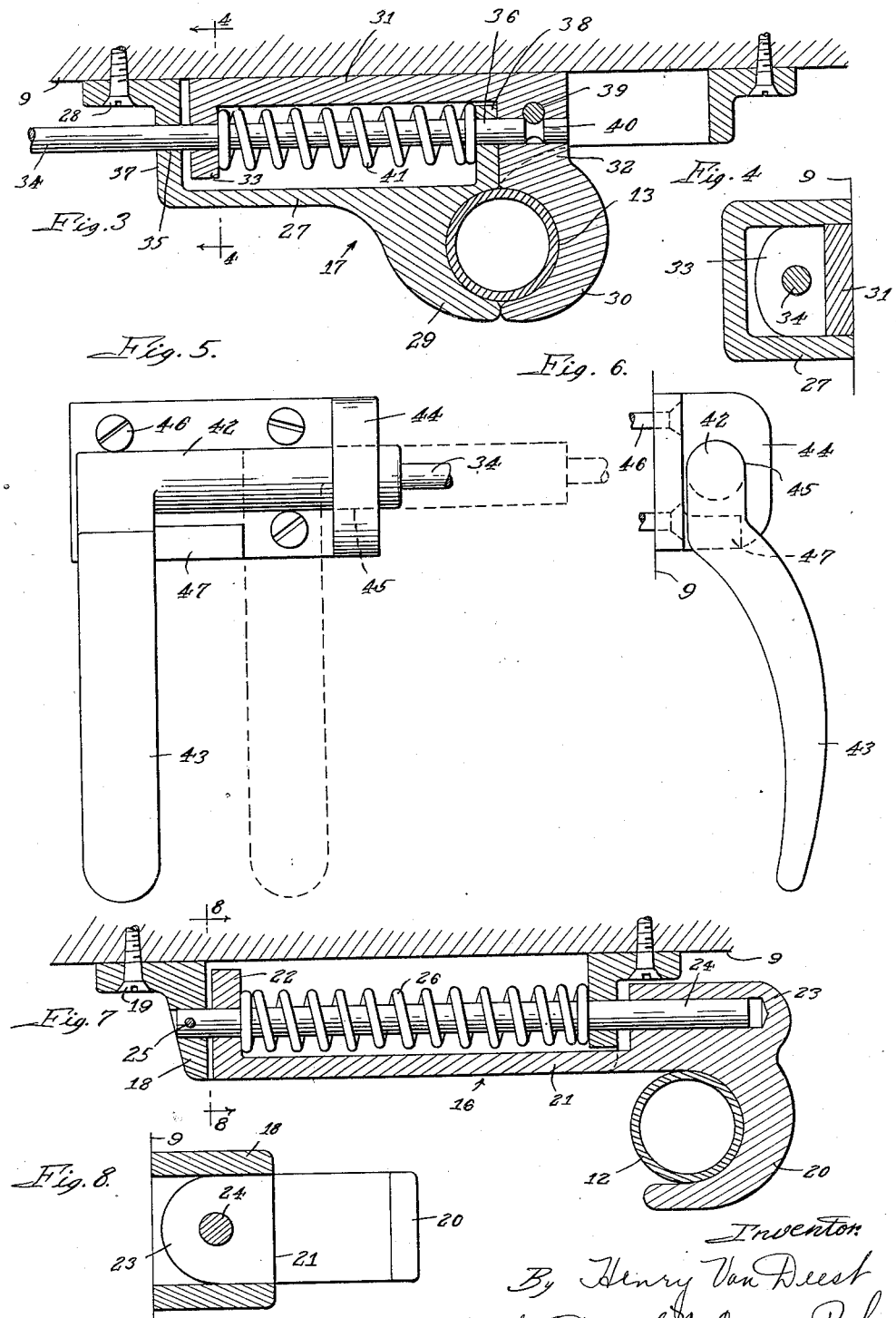

Patented May 24, 1932

1,859,480

UNITED STATES PATENT OFFICE

HENRY VAN DEEST, OF FREEPORT, ILLINOIS, ASSIGNOR TO HENNEY MOTOR COMPANY, OF FREEPORT, ILLINOIS, A CORPORATION OF DELAWARE

COT FASTENER FOR AMBULANCES

Application filed March 23, 1931. Serial No. 524,485.

This invention relates to cot fasteners for use in ambulances and other vehicles.

Cot fasteners have been available in various forms but have been subject to one or more serious objections. In some cases the fasteners were apt to allow movement of the cot, especially if the vehicle were to suddenly slow down or make a sharp turn, and with certain constructions such movement was apt to cause unfastening of the cot. Then, too, there has been the objection with most cot fasteners that the fastening and unfastening of the cot is not as handy as desired and takes up too much time. It is, therefore, the principal object of my invention to provide cot fasteners which not only positively lock the cot in position but are so arranged and constructed that the fastening and unfastening of the cot can be attended to easily from a remote point, as for example, from the rear door of an ambulance.

The invention is fully described in the following specification, in which reference is made to the accompanying drawings, wherein—

Figure 1 is a plan view showing cot fasteners made in accordance with my invention in a typical ambulance installation, with the cot shown in an intermediate position about to be fastened to the wall by the fasteners or unfastened therefrom;

Fig. 2 is a side elevation showing the cot fastened in place;

Fig. 3 is a horizontal sectional detail of the rear fastener on the line 3—3 of Fig. 2 on an enlarged scale;

Fig. 4 is a cross-section on the line 4—4 of Fig. 3;

Figs. 5 and 6 are two views of the handle end of the rear fastener;

Fig. 7 is a horizontal section through the front fastener taken on the line 7—7 of Fig. 2, and Fig. 8 is a cross-section on the line 8—8 of Fig. 7.

The same reference numerals are applied to corresponding parts throughout the views.

The numerals 9 and 10 indicate the side wall and floor, respectively, of the ambulance or other vehicle in which the cot shown at 11 is to be fastened in place. The cot may be of any suitable or preferred construction, that shown being of the conventional form providing front and rear legs 12 and 13, respectively, by means of which the same may be conveniently fastened to the side wall 9. As usual, wheels 14 are provided on the cot to permit it to be rolled into and out of position on the floor 10 in the ambulance. The wheels are preferably mounted as at 15 so as to caster and thus permit sidewise movement at will. Two fasteners are provided, a front fastener 16 and a rear fastener 17 arranged to cooperate with the legs 12 and 13, respectively, to fasten the cot to the side wall 9.

Referring to Figs. 7 and 8, it will be seen that the front fastener 16 comprises a housing 18 suitably fastened by its base portion, as at 19, to the side wall. A rearwardly facing hook 20 has an elongated shank portion 21 slidably mounted for fore and aft movement in the housing 18 by means of lugs 22 and 23 which are slidably mounted on a rod 24 fixed at one end as by means of a pin 25 to that end of the housing. A coiled compression spring 26 fits about the rod 24 in the housing 18 between the lug 22 and the other end of the housing and tends normally to urge the hook 20 rearwardly, whereby to securely hold onto the front leg 12 of the cot. The spring 26 is, however, arranged to yield to permit forward movement of the hook with the leg 12 when the cot is being maneuvered into position to be fastened, as will soon appear.

The rear fastener 17 comprises another housing 27 fastened at its base portion, as at 28, to the side wall 9. On the outside of this housing I provide a forwardly facing hook 29 onto which the rear leg 13 of the cot is arranged to be engaged. The hook 29 has another hook 30 arranged to cooperate with it, the hook 30 being of a rearwardly facing form like the hook 20 and being arranged to grip the leg 13 from the opposite side, whereby to hold the leg as between the jaws of a vice between the hooks 29 and 30. The hook 30 has an elongated shank 31 extending rearwardly from its butt portion 32 and slidably received in the housing 27. A lug 33 is formed on the rear end of the shank 31, and a rod 34, which is slidable in registering holes 35 and 36 provided in the end wall 37 and lug 38 of the housing, passes through the lug 33 and is swiveled in the butt portion 32, as by means of a pin 39 driven into a hole in the butt portion and fitting in an annular groove 40 provided in the end of the rod. A coiled compression spring 41 fits about the rod 34 in the housing 27 and engages the lug 33 at one end and the lug 38 at the other end so that it tends normally to urge the hook 30 rearwardly toward the hook 29. The spring 41 may be sufficiently heavy so that the pressure thereof can be relied upon to keep the hook 30 in position holding the leg 13 between the hooks 29 and 30. However, I prefer to provide means for positively locking the hook 30 in closed position, to forestall any danger whatever of the hook 30 allowing the release of the leg 13. This means will now be described.

The rod 34 is of sufficient length to reach clear beyond the foot end of the cot and has a shank 42 of a handle 43 mounted on the extremity thereof. A bracket 44 provides a guide at 45 for the shank 42 of the handle and is suitably secured as at 46 to the side wall 9, preferably immediately adjacent the rear door, in the case of an ambulance. A lug 47 projects laterally from the bracket 44 below the shank 42 and is so located that the handle 43 is arranged to be swung downwardly behind the same when the hook 30 is in closed position, whereby to positively lock the hook in that position. On the other hand, the lug is wide enough so that when the handle 43 is swung upwardly and shoved forward and then swung downwardly in front of the lug, as indicated in dotted lines in Fig. 5, the hook 30 is held positively in the open position shown in Figure 1, spaced far enough from the hook 29 to permit the easy entry or removal therebetween of the leg 13. It is, therefore, clear that the lug 47 serves a double purpose.

In operation, when the cot is rolled into position in the ambulance for fastening, the front leg 12 is brought into engagement with the hook 20 of the front fastener 16 and then the cot is moved forwardly against the resistance of the spring 26 far enough to bring the rear leg 13 into position where it can be entered between the hooks 29 and 30 by sidewise movement of the rear end of the cot in a manner thought to be self-evident. As soon as the leg 13 enters the hook 29, the handle 43 can be swung upwardly to clear the lug 47, whereupon the spring 41 will snap the hook 30 into engagement with the leg 13 from the other side. This, it will be understood, more or less firmly fastens the cot in place, but to make certain that the cot cannot become unfastened accidentally, the handle 43 is arranged to be swung downwardly behind the lug 47 to positively lock the hook 30 in closed position. It is obvious that no matter how suddenly the ambulance slows down or starts up, and no matter how sharply corners are turned, there is no way for the cot to work loose, and that is because there is no possibility of its having any movement whatsoever. Even slight movement is objectionable because of the jostling back and forth and the noise that goes with it, all of which would be more or less distressing to the person on the cot. In most other cot fasteners with which I am familiar, there is no possibility of fastening the cot so rigidly as herein disclosed, and certain cot fasteners are so constructed that extreme movement of the cot, especially if attended with side sway of the ambulance, is quite apt to cause the cot to become disconnected. When the ambulance arrives at its destination, the attendant simply swings the handle 43 up over the lug 47 and shoves the same forwardly and then downwardly in front of the lug to move the jaw 30 to open position against the action of the spring 41. The hook is thereby locked in open position, and the attendant removes the cot by simply pushing it forward enough to allow the rear leg 13 to be moved sidewise off the hook 29, whereupon the cot can be rolled away from the hook 20 and out of the ambulance. It is believed to be clear from the description how quickly and easily the matter of fastening and unfastening can be attended to.

I claim:

1. Fastening means for a cot or the like comprising a pair of spaced stationary housings arranged to be suitably supported adjacent the front and rear portions of a cot to be fastened, a hook projecting rigidly from the one housing and facing in one direction to hold one portion of the cot, a companion hook projecting from the other housing and facing in the opposite direction to hold the other portion of the cot, means for slidably mounting the last mentioned hook on its housing for movement toward and away from the first hook, spring means in said housing normally urging the slidable hook to move relative to the housing in one direction to hold the cot portion thereon, the cot being arranged to be engaged on the hooks by engagement of the one portion first with the slidable hook to permit movement of said hook against the action of its spring means by manual movement of the cot so as to permit engagement of the other cot portion with the stationary hook, and a member slidable on the other housing toward and away from the stationary hook and arranged to be fixed in a position holding the cot portion engaged on the stationary hook.

2. Fastening means for a cot or the like comprising a pair of spaced bases arranged to be suitably supported adjacent the front and rear portions of a cot to be fastened, a hook projecting rigidly from the one base and facing in one direction to hold one portion of the cot, a companion hook projecting from the other base and facing in the opposite direction to hold the other portion of the cot, means for slidably mounting the last montioned hook on its base for movement toward and away from the first hook, spring means on said base normally urging the slidable hook to move relative to the base in one direction to hold the cot portion thereon, the cot being arranged to be engaged on the hooks by engagement of the one portion, first, with the slidable hook to permit movement of said hook against the action of its spring means by manual movement of the cot so as to permit engagement of the other cot portion with the stationary hook, a locking member slidable on the same base with the stationary hook for movement toward and away from said stationary hook to grip the cot portion therebetween, spring means normally urging the locking member to move in one direction to hold the cot portion, a rod fixed to the locking member and extending from the base to an operating point, a handle on said rod at the operating point, and stop means for abutment with the handle to hold the same in either one of two positions, the handle in one position being held by the stop means to prevent movement of the hook by the cot against the action of the spring means, and the handle being held by the stop means in its other position to hold the hook in retracted position and against movement under action of the spring means.

3. Fastening means for a cot or the like comprising a pair of spaced bases arranged to be suitably supported adjacent the front and rear portions of a cot to be fastened, a hook projecting rigidly from the one base and facing in one direction to hold one portion of the cot, a companion hook projecting from the other base and facing in the opposite direction to hold the other portion of the cot, means for slidably mounting the last mentioned hook on its base for movement toward and away from the first hook, spring means on said base normally urging the slidable hook to move relative to the base in one direction to hold the cot portion thereon, the cot being arranged to be engaged on the hooks by engagement of the one portion, first, with the slidable hook to permit movement of said hook against the action of its spring means by manual movement of the cot so as to permit engagement of the other cot portion with the stationary hook, a locking member slidable on the same base with the stationary hook for movement toward and away from said stationary hook to grip the cot portion therebetween, spring means for moving the locking member normally in one direction, a rod fixed to the locking member and extending from the base to an operating point to communicate movement to the locking member by endwise movement of said rod, a handle on the end of said rod at the operating point, and stop means for holding the handle in either one of two positions, the handle being held in one position by the stop means to prevent movement of the locking member by the cot, and the handle being held in its other position by the stop means to prevent movement of the locking member by the spring means.

4. Fastening means for a cot or the like comprising a pair of spaced bases arranged to be suitably supported adjacent the front and rear portions of a cot to be fastened, a hook projecting rigidly from the one base and facing in one direction to hold one portion of the cot, a companion hook projecting from the other base and facing in the opposite direction to hold the other portion of the cot, means for slidably mounting the last mentioned hook on its base for movement toward and away from the first hook, spring means on said base normally urging the slidable hook to move relative to the base in one direction to hold the cot portion thereon, the cot being arranged to be engaged on the hooks by engagement of the one portion, first, with the slidable hook to permit movement of said hook against the action of its spring means by manual movement of the cot so as to permit engagement of the other cot portion with the stationary hook, and a member slidable relative to one of said bases toward the hook thereon and arranged to be fixed in a position locking the cot in place between the hooks.

In witness of the foregoing I affix my signature.

HENRY VAN DEEST.